(12) United States Patent
Cedergren

(10) Patent No.: US 7,551,106 B1
(45) Date of Patent: Jun. 23, 2009

(54) ADJUSTING SOFT VALUES TO REDUCE BIAS

(75) Inventor: Andreas Cedergren, Bjärred (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 11/958,427

(22) Filed: Dec. 18, 2007

(51) Int. Cl.
*H03M 7/00* (2006.01)

(52) U.S. Cl. .................... 341/50; 375/130

(58) Field of Classification Search .......... 341/50–70; 375/341, 347, 346, 324, 332; 714/794, 758, 714/780
See application file for complete search history.

(56) References Cited

U.S. PATENT DOCUMENTS

| | | | |
|---|---|---|---|
| 6,823,027 B2 * | 11/2004 | Malmberg et al. | 375/341 |
| 6,967,598 B2 * | 11/2005 | Mills | 341/50 |
| 7,003,055 B2 * | 2/2006 | Sexton et al. | 375/341 |
| 7,072,426 B2 * | 7/2006 | Ha et al. | 375/331 |
| 7,206,364 B2 * | 4/2007 | Miller | 375/341 |
| 7,231,577 B2 * | 6/2007 | Richardson et al. | 714/758 |
| 7,466,771 B2 * | 12/2008 | Miller | 375/340 |
| 7,480,342 B2 * | 1/2009 | Wilhelmsson et al. | 375/286 |
| 7,502,412 B2 * | 3/2009 | Chen | 375/229 |
| 2008/0240303 A1 * | 10/2008 | Shao et al. | 375/341 |

FOREIGN PATENT DOCUMENTS

GB  2434948  8/2007

* cited by examiner

*Primary Examiner*—Lam T Mai
(74) *Attorney, Agent, or Firm*—Coats & Bennett, P.L.L.C.

(57) ABSTRACT

A method is described for adjusting soft values in a code block prior to decoding. A count of saturated soft values in a code block is determined and one or more of the soft values in the code block are adjusted based on the count of saturated soft values. The count may be determined by incrementing the count for each positive saturated soft value and decrementing the count of each negative saturated soft value. The soft values may be adjusted by adding an offset computed based on the count to the soft values.

16 Claims, 5 Drawing Sheets

ADJUSTING SOFT VALUES TO REDUCE BIAS

BACKGROUND

The present invention relates generally to decoding of received signals and, more particularly, to a method for compensating soft values that are input to a decoder to account for bias attributable to bit width limitations.

The ultimate purpose of a communication system is to transmit information from an information source to a destination over a communication channel. In wireless communication systems, noise and multipath fading cause bit errors to occur during transmission. Forward error correction (FEC) may be employed to significantly reduce the number of bit errors. An encoder at the transmitter adds redundancy to information prior to its transmission. At the receiver, a decoder makes use of the redundant information and a priori knowledge of the coding scheme to detect and correct errors that may have occurred during transmission of the information.

In some communication systems, the received signal is demodulated by the receiver to generate soft values for input to the decoder rather than hard bit decisions. The soft values contain reliability information that can be exploited by the decoder to improve decoding. The number of bits used to represent the soft values, hereinafter referred to as the bit width, is one consideration in the design of a soft value decoder. It is usually desirable to limit the bit width of the soft values to reduce the computational complexity of the decoder. However, limiting the bit width of the soft values may degrade the performance of the decoder.

The channel decoder is typically designed based on the assumption that the noise will have a zero mean. When the bit width is limited, many of the soft values may become saturated. If the number of saturated values is unevenly matched between the positive and negative values, the noise introduced by the communication channel cannot be assumed to have zero mean. When the positive saturated values exceed the negative saturated values, the mean of the noise will be low. Conversely, when the negative saturated values exceed the positive saturated values, the mean of the noise will be high. If the bias introduced by limiting the bit width of the soft values is not compensated for, the performance of the decoder may be degraded.

SUMMARY

The present invention provides a method and apparatus to compensate for bias introduced by limiting the bit width of soft values input to a soft value decoder. According to one exemplary embodiment, a count of saturated soft values in a code block is made, and one or more soft values in the code block are compensated based on the saturation count. In some embodiments, the saturation count is incremented for positive saturated soft values and decremented for negative saturated soft values. The saturation count may then be used to generate an offset that is added to soft values in the code block. In one exemplary embodiment, the saturation count may be used to generate a saturation ratio that is mapped to one of two or more predetermined offsets.

DETAILED DESCRIPTION

Figure 1:
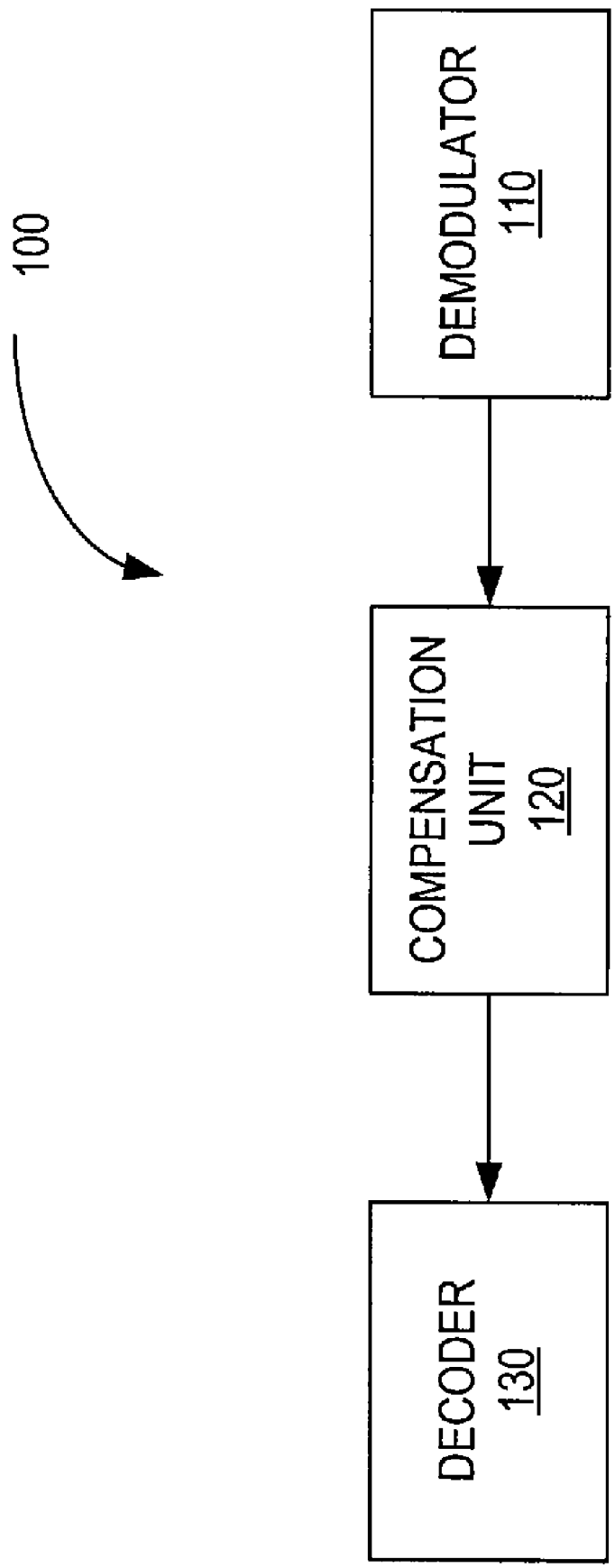
FIG. 1 is a functional block diagram illustrating an exemplary receiver including a soft value decoder and compensation unit to compensate soft values input to the soft value decoder.

FIG. 1 illustrates an exemplary receiver 100 according to one embodiment of the invention. Receiver 100 comprises a demodulator 110, compensation unit 120, and soft value decoder 130. The demodulator 110 demodulates a received signal to generate soft values for decoding. The compensation unit 120 compensates the soft values output by the decoder 100 for bias introduced by limiting the bit width of the soft values. The soft value decoder 130 decodes the soft values to recover the transmitted information.

The demodulator 110 may, for example, comprise a generalized RAKE receiver (GRAKE), chip equalizer, or other type of demodulator that outputs soft values for decoding. The decoder 130 may, for example, comprise a trellis decoder, such as a Viterbi decoder, that accepts soft values as an input. The compensation unit 120 is interposed between the demodulator 110 and decoder 130. The bit width of the soft values output by the demodulator 110 may be limited to reduce the computational complexity of the decoder 130. Compensation unit 120 compensates for bias attributable to bit width limitations of the soft values.

Figure 2:
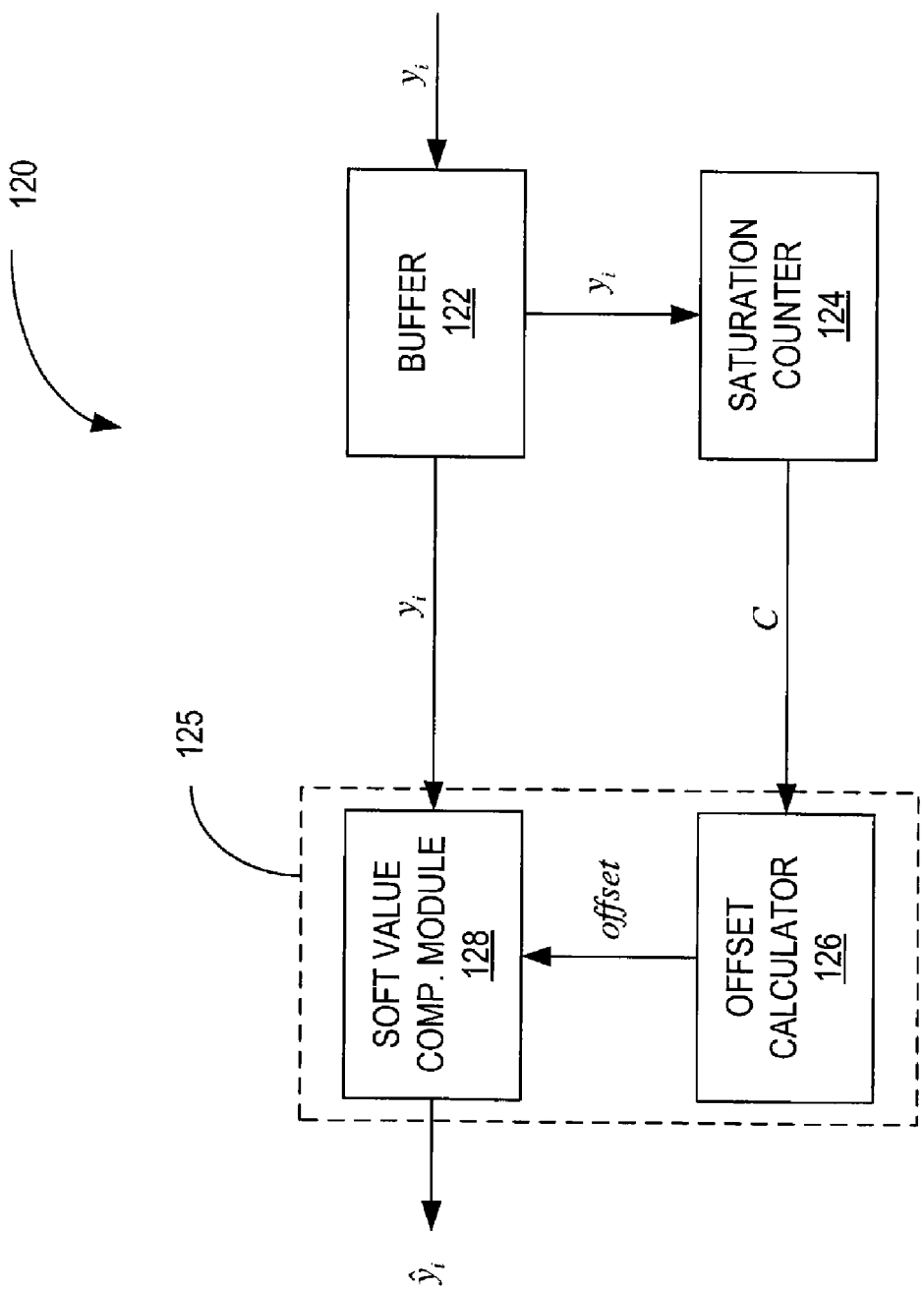
FIG. 2 is a block diagram illustrating an exemplary compensation unit for compensating soft values input to a soft value decoder.

FIG. 2 illustrates an exemplary compensation unit 120 according to one embodiment of the invention. The compensation unit 120 comprises a buffer 122, saturation counter 124, and adjustment unit 125. A code block containing a plurality of soft values $y_i$ is stored temporarily in the buffer 122. The saturation counter 124 produces a count C of saturated soft values in the code block. In one embodiment, a single count is produced for positive and negative saturated soft values. However, those skilled in the art will appreciate that separate counts could be made for positive and negative saturated soft values. The saturation counter 124 outputs a saturation count C to the adjustment unit 125. The saturation count C will have a positive value when the positive saturated soft values outnumber the negative saturated soft values and will have a negative value when the negative saturated soft values outnumber the positive saturated soft values. When the number of positive and negative saturated soft values is equal, the saturation count C will equal zero.

Compensation unit 125 compensates the soft values $y_i$ in a code block for bias attributable to bit width limitations. The compensation unit 125 comprises an offset calculator 126 and a soft value compensation module 128. The offset calculator 126 computes an offset based on the saturation count C, which is to be added to the soft values in the code block. The soft value compensation module 128 compensates the soft values based on the offset supplied by the offset calculator 126. The soft values are read sequentially from the buffer 122. The soft value compensation module 128 adds an amount equal to the offset to selected soft values. In one embodiment, the offset is added to all of the soft values in the code block. If the compensated soft values exceed predetermined maximum values, the soft value compensation module 128 limits the compensated soft value to a predetermined maximum value. The compensated soft values $\hat{y}_i$ are then output to the decoder 130.

Figure 3:
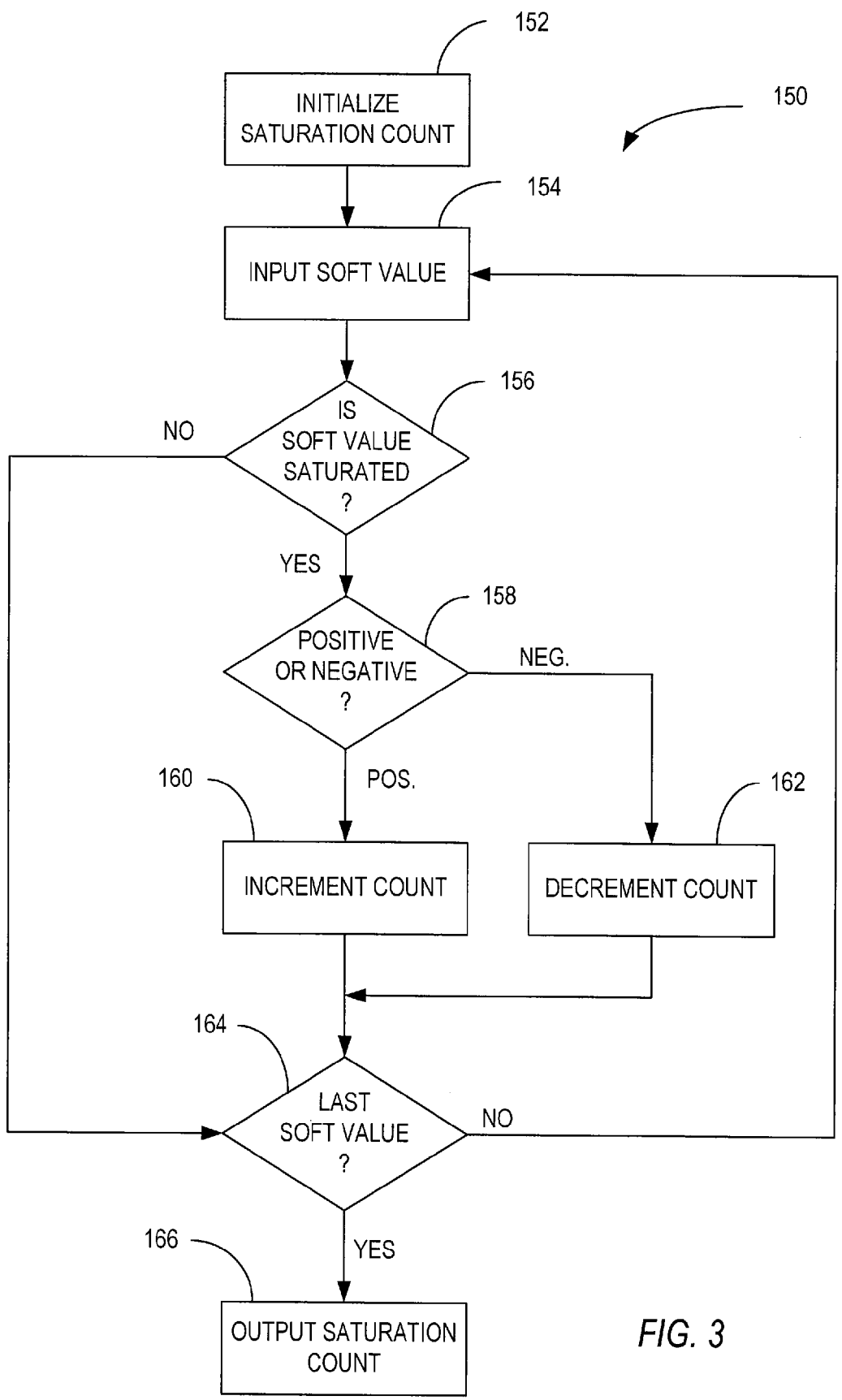
FIG. 3 is an exemplary procedure for generating a saturation count for soft values in a code block.

FIG. 3 illustrates an exemplary procedure 150 implemented by the saturation counter 124 for generating a saturation count C. Process 150 begins by initializing the saturation counter 124 when a new block is received (block 152). The soft values are fed one at a time to the saturation counter 124 (block 154). For each soft value in the code block, the saturation counter 124 determines whether the soft value is saturated (block 156) and whether the soft value is positive or negative (block 158). If a soft value 156 is saturated, the saturation counter increments the saturation count C for each positive saturated soft value (block 160) and decrements the saturation count C for each negative saturated soft value (block 162). If the soft value is not saturated, the saturation count C does not change. After each soft value is processed, the saturation counter 124 determines whether the last soft value has been reached (block 164). If not, the process repeats until the last soft value is reached. When the last soft value is reached, the saturation counter 124 outputs the final saturation count to the offset calculator 126 (block 166).

Figure 4:
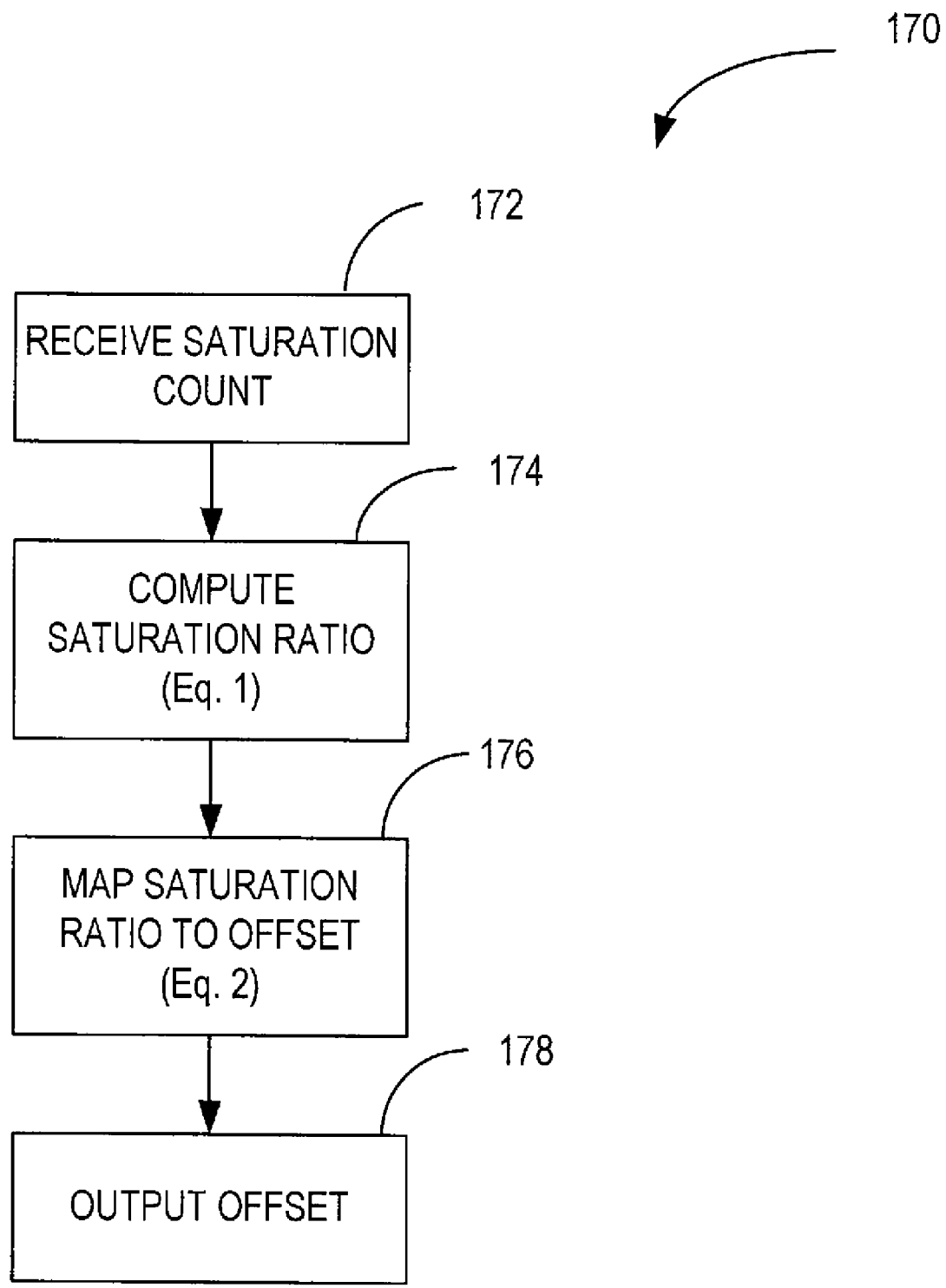
FIG. 4 is an exemplary procedure for computing an offset for compensating soft values in a code block.

FIG. 4 illustrates an exemplary procedure 170 implemented by the offset calculator 126 for computing an offset used to compensate soft values. The offset calculator 126 receives the saturation count C from the saturation counter (block 172) and computes a saturation ratio R based on the saturation count C (block 174). In one exemplary embodiment, the saturation ratio R is given by:

$$R = \frac{|C|}{N}, \qquad \text{Eq. (1)}$$

where N is the number of soft values in the code block. Offset calculator 126 then maps the saturation ratio R given by Eq. 1 to a corresponding offset (block 176). In one exemplary embodiment, there may be a limited number of predetermined offsets. As one example, the offsets may be limited to 0, ±1, and ±2. The offset calculator 126 determines which one of the predetermined offsets to use based on the saturation ratio R and the sign of the saturation count (sign(C)). An exemplary mapping function is given by:

$$\text{offset} = \text{sign}(C) \begin{cases} 0 & R < t_1 \\ 1 & t_1 \leq R < t_2 \\ 2 & R \geq t_2 \end{cases}, \qquad \text{Eq. (2)}$$

where $t_1$ and $t_2$ are predetermined threshold values. The threshold values are values in the range of 0.0 to 1.0. Exemplary threshold values are $t_1$=0.125 and $t_2$=0.35. The mapping function selects an offset of 0 when the saturation ratio R is less than $t_1$, selects ±1 when the saturation ratio is greater than or equal to $t_1$ and less than $t_2$, and selects ±2 when the saturation ratio is greater than or equal to $t_2$. The sign of the offset is determined by the sign of the saturation count C. Once the offset is determined, the offset is output to the soft value compensation module 128 (block 178).

Figure 5:
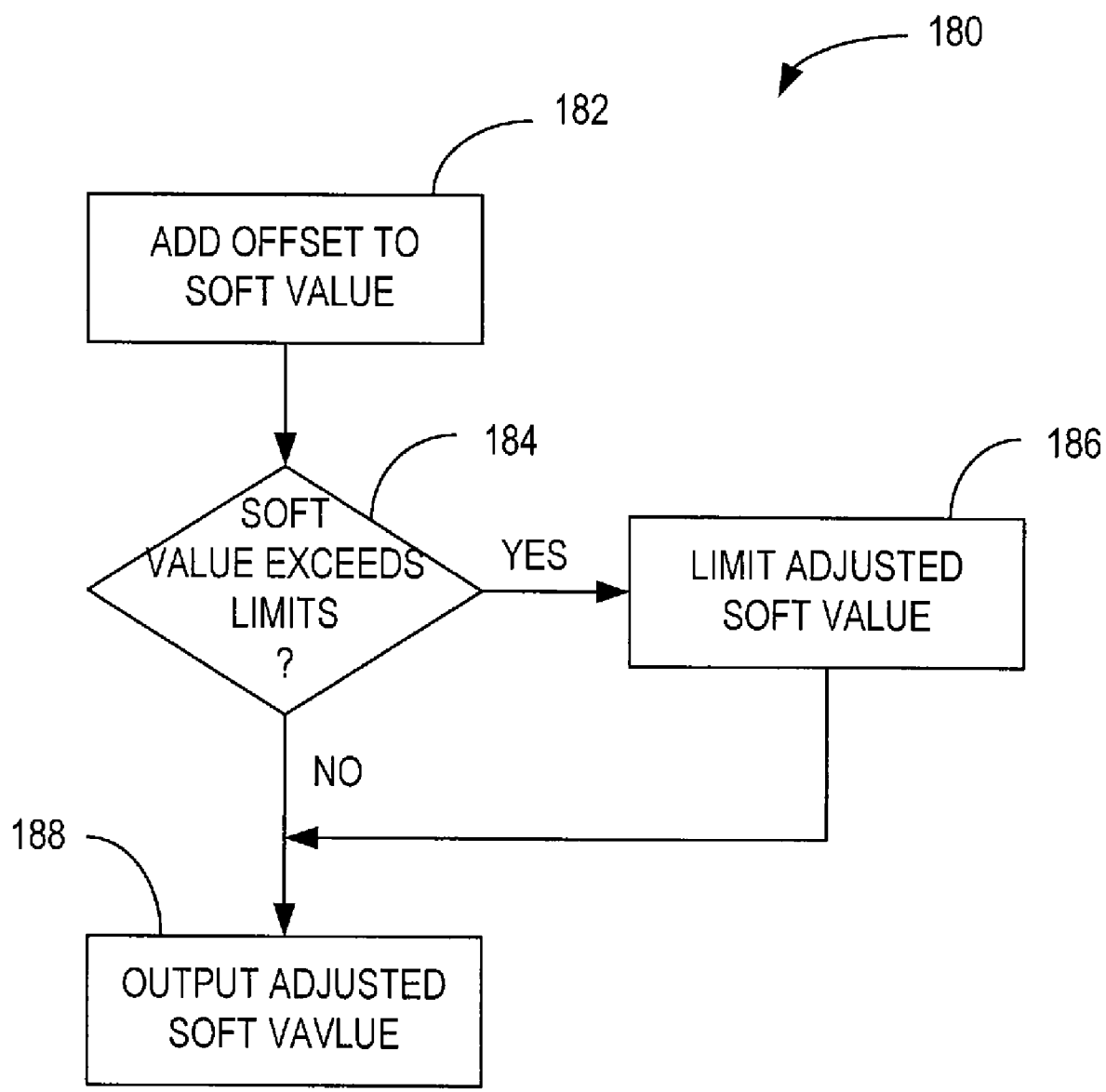
FIG. 5 is an exemplary procedure for adjusting soft values in a code block.

FIG. 5 illustrates a exemplary procedure 180 implemented by the soft value compensation module 128 for compensating soft values. In the exemplary embodiment shown, the soft value compensation module 128 adjusts each one of the soft values in the code block based on the offset provided by the offset calculator 126. An exemplary adjustment function for adjusting the soft values is given by:

$$\hat{y}_i = \begin{cases} P_{MAX} & y_i + \text{offset} > P_{MAX} \\ -P_{MAX} & y_i + \text{offset} < -P_{MAX} \\ y_i + \text{offset} & \text{else} \end{cases}. \qquad \text{Eq. (3)}$$

The soft values are fed to the soft value compensation module 128 one at a time. For each soft value, the soft value compensation module 128 adds the offset computed in Eq. 2 to the soft value $y_i$ (block 182) to obtain an adjusted soft value $\hat{y}_i$. After adding the offset, the soft value compensation module 128 determines whether the adjusted soft value $\hat{y}_i$ exceeds predetermined limits (block 184). In the exemplary embodiment, the magnitude of the adjusted soft value $\hat{y}_i$ is limited to a predetermined maximum magnitude $P_{MAX}$. Adjusted soft values $\hat{y}_i$ falling in the range of $-P_{MAX}$ to $P_{MAX}$ are output to the decoder 130 (block 188). Adjusted soft values $\hat{y}_i$ greater than $P_{MAX}$ are adjusted down to equal $P_{MAX}$ (block 186) and output to the decoder 130 (block 188). Adjusted soft values $\hat{y}_i$ less than $-P_{MAX}$ are adjusted upward to equal $-P_{MAX}$ (block 186) and output to the decoder 130 (block 188).

From the foregoing, it can be seen that the soft value compensation module 128 leaves the soft values unchanged when the magnitude of the saturation count C is low. As the magnitude of the saturation count C increases, the soft value compensation module 128 increases the magnitude of the offset in step-wise fashion. The threshold values $t_1$ and $t_2$ can be adjusted to the location of the step changes in the offset.

By compensating the soft values prior to the decoder 130, it is possible to limit the bit width of the soft values, and thus reduce decoder complexity while still maintaining good performance levels. The present invention may, of course, be carried in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of adjusting soft values input to a decoder in a wireless receiver, said method comprising:
   determining a count of saturated soft values in a code block containing a plurality of soft values output by a demodulator; and
   adjusting said soft values in said code block based on said count of saturated soft values to compensate for bias attributable to bit width limitations of the decoder.

2. The method of claim 1 wherein determining a count of saturated soft values comprises incrementing said count for each positive saturated soft value in said code block, and decrementing said count for each negative saturated soft value in said code block.

3. The method of claim 1 wherein adjusting said soft values in said code block comprises computing an offset based on said count, and adding said offset to one or more soft values in said code block.

4. The method of claim 3 wherein adjusting said soft values in said code block further comprises limiting the adjusted soft values to a predetermined maximum value.

5. The method of claim 3 wherein computing the offset comprises determining a saturation ratio based on said count, and selecting one of two or more predetermined offsets based on said saturation ratio.

6. The method of claim 5 wherein determining the saturation ratio comprises dividing said count by a number of soft values in said code block.

7. The method of claim 5 wherein selecting one of two or more predetermined offsets based on said saturation ratio comprises mapping said saturation ratio to a corresponding offset.

8. The method of claim 7 wherein mapping said saturation ratio to a corresponding offset comprises comparing said saturation ratios to one or more threshold values and selecting an offset based on an outcome of said comparisons.

9. A device for adjusting soft values input to a decoder in a wireless receiver, said device comprising:

a saturation counter to determine a count of saturated soft values in a code block containing a plurality of soft values output by a demodulator; and an adjustment unit for adjusting one or more soft values in said code block based on said count to compensate for bias attributable to bit width limitations of the decoder.

10. The device of claim 9 wherein said saturation counter is configured to increment said count for each positive saturated soft value in said code block, and decrement said count for each negative saturated soft value in said code block.

11. The device of claim 9 wherein the adjustment unit comprises an offset calculator to compute an offset based on said count, and a modification unit to add said offset to one or more soft values in said code block.

12. The device of claim 11 wherein the modification unit is further configured to limit the adjusted soft values to a predetermined maximum value.

13. The device of claim 11 wherein said offset calculator is configured to compute a saturation ratio based on said count and to select one of two or more predetermined offsets based on said saturation ratio.

14. The device of claim 13 wherein said offset calculator determines said saturation ratio by dividing said count by a number of soft values in said code block.

15. The device of claim 13 wherein said offset calculator is further configured to map said saturation ratio to a corresponding offset.

16. The device of claim 15 wherein said offset calculator maps said saturation ratio to a corresponding offset by comparing said saturation ratios to one or more threshold values and selecting an offset based on an outcome of said comparisons.

\* \* \* \* \*